United States Patent
Inaba et al.

(10) Patent No.: US 9,196,281 B2
(45) Date of Patent: Nov. 24, 2015

(54) PERPENDICULAR MAGNETIC RECORDING MEDIUM HAVING TAILORED GRANULAR LAYERS

(71) Applicant: FUJI ELECTRIC CO., LTD., Kawasaki-shi (JP)

(72) Inventors: Yuki Inaba, Matsumoto (JP); Takayuki Hirose, Sagamihara (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 226 days.

(21) Appl. No.: 13/909,609

(22) Filed: Jun. 4, 2013

(65) Prior Publication Data

US 2014/0030552 A1 Jan. 30, 2014

(30) Foreign Application Priority Data

Jul. 26, 2012 (JP) .................................. 2012-165954

(51) Int. Cl.
G11B 5/66 (2006.01)
G11B 5/73 (2006.01)
G11B 5/65 (2006.01)

(52) U.S. Cl.
CPC .. *G11B 5/66* (2013.01); *G11B 5/65* (2013.01); *G11B 5/7325* (2013.01)

(58) Field of Classification Search
None
See application file for complete search history.

(56) References Cited

U.S. PATENT DOCUMENTS

| 8,530,065 | B1* | 9/2013 | Chernyshov et al. | 428/829 |
| 8,859,118 | B2* | 10/2014 | Tachibana et al. | 428/831 |
| 8,877,359 | B2* | 11/2014 | Saito et al. | 428/828.1 |
| 2004/0110035 | A1* | 6/2004 | Shin et al. | 428/694 T |
| 2007/0072011 | A1* | 3/2007 | Li et al. | 428/828.1 |
| 2008/0311430 | A1* | 12/2008 | Chen et al. | 428/827 |
| 2013/0314815 | A1* | 11/2013 | Yuan et al. | 360/59 |
| 2014/0030552 | A1* | 1/2014 | Inaba et al. | 428/828 |

OTHER PUBLICATIONS

J. S. Chen et al., "High coercive L1$_0$ FePt—C (001) nanocomopsite films with small grain size for perpendicular recording media", Journal of Applied Physics 103, pp. 07F517-1-07F517-3, Feb. 6, 2008.
Antje Dannenberg et al., "Surface energies of stoichiometric FePt and CoPt alloys and their implications for nanoparticle morphologies", Physical review B 80, pp. 245438-1-245438-15, Dec. 29, 2009.

(Continued)

*Primary Examiner* — Kevin Bernatz
(74) *Attorney, Agent, or Firm* — Rabin & Berdo, P.C.

(57) ABSTRACT

A perpendicular magnetic recording medium is disclosed. The perpendicular magnetic recording medium includes a first layer, and a second layer positioned immediately below the first layer. Among the materials in the first layer and the second layer, if the interface energy when two different materials—material a and material b—are in contact is defined as Ei(a//b), the surface energy when material a exists independently is defined as Es(a), and the energy resulting by subtracting the sum of the respective surface energies (ΣEs) from the interface energy is defined as G(a//b), then when G(1//3)<G(1//4) holds, either G(2//4) or G(1//3) is the minimum among G(1//3), G(1//4), G(2//3) and G(2//4), and when G(1//3)<G(1//4) does not hold, G(2//4) is the minimum among G(1//3), G(1//4), G(2//3) and G(2//4).

9 Claims, 5 Drawing Sheets

(56) References Cited

OTHER PUBLICATIONS

Y. Inaba et al., "Optimization of the $SiO_2$ content in CoPtCr—$SiO_2$ perpendicular recording media for high-density recording", IEEE Transactions on Magnetics, vol. 40, No. 4, pp. 2486-2488, Jul. 2004.

Y. Inaba et al., "Preliminary study on (CoPtCr/NiFe)—$SiO_2$ hard/soft-stacked perpendicular recording media", IEEE Transaction on Magnetics, vol. 41, No. 10, pp. 3136-3138, Oct. 2005.

Shun-ichi Iwasaki et al., "Co—Cr recording films with perpendicular magnetic anisotropy", IEEE Transactions on Magnetics, vol. MAG-14, No. 5, pp. 849-851, Sep. 1978.

Ryoichi Mukai et al., "Microstructure improvement of thin Ru underlayer for CoCrPt—$SiO_2$ granular perpendicular media", IEEE Transactions on Magnetics, vol. 41, No. 10, pp. 3169-3171, Oct. 2005.

Akihiro Murayama et al., "Magnetic and structural properties of CoNiPt($SiO_2$) alloy films for high-density longitudinal recording", J. Appl. Phys. vol. 76, No. 9, pp. 5361-5370, Nov. 1, 1994.

T. Oikawa et al., "Microstructure and magnetic properties of CoPtCr—$SiO_2$ perpendicular recording media", IEEE Transaction on Magnectics, vol. 38, No. 5, pp. 1976-1978, Sep. 2002.

W. K. Shen, "In situ epitaxial growth of ordered FePt (001) films with ultra small and uniform grain size using a RuAl underlayer", Journal of Applied Physics 97, 10H301, pp. 10H301-1-10H301-3, May 11, 2005.

D. Suess et al., "Exchange spring media for perpendicular recording", Applied Physics Letters 87, 012504, pp. 012504-1-012504-3, Jun. 30, 2005.

I. Takekuma et al., "Reduction in intermediate layer thickness of CoCrPt—SiO2 perpendicular recording media by using Ru—SiO2", Journal of Applied Physics 99, 08E713, pp. 08E713-1-08E713-3, Apr. 27 2006.

R. H. Victora et al., "Composite media for perpendicular magnetic recording", IEEE Transactions on Magnetics, vol. 41, No. 2, pp. 537-542, Feb. 2005.

Katsuyuki Matsunaga et al., "Bonding nature of metal/oxide incoherent interfaces by first-principles calculations", Physical Review B 74, 125423, pp. 125423-1-125423-8, Sep. 27, 2006.

* cited by examiner

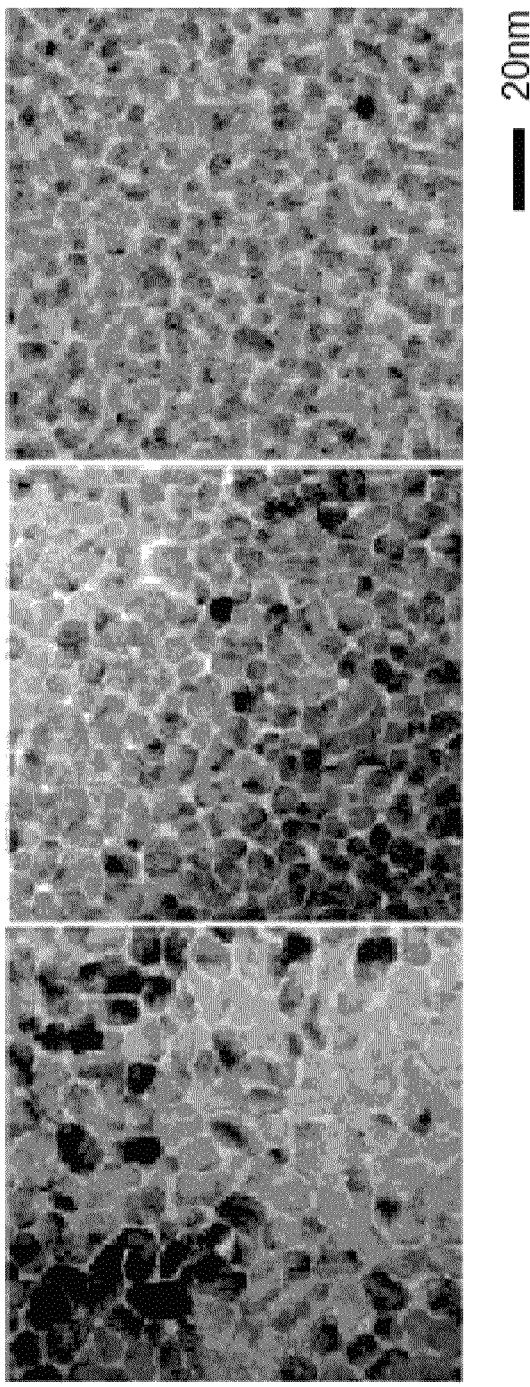

PERPENDICULAR MAGNETIC RECORDING MEDIUM HAVING TAILORED GRANULAR LAYERS

CROSS-REFERENCE TO RELATED APPLICATIONS

This application claims priority to Japanese Patent Application No. 2012-165954 filed on Jul. 26, 2012, the entirety of which is hereby incorporated by reference in its entirety.

BACKGROUND OF THE INVENTION

1. Field of the Invention

This invention relates to a perpendicular magnetic recording medium, and preferably relates to a perpendicular magnetic recording medium mounted in various magnetic recording devices including the external recording devices of computers.

2. Description of the Related Art

Two magnetic recording methods, which are an in-plane magnetic recording method and a perpendicular magnetic recording method, are used in hard disk devices, magneto-optical recording devices (MO), magnetic tape devices, and other magnetic recording devices. For both of these methods, there are two important issues to improve recording densities.

The first issue is that of reducing the magnetostatic coupling forces between magnetic crystal grains so that signals can be written in minute regions. For example, in in-plane magnetic recording media and in early perpendicular magnetic recording media, material systems based on Co with Cr added were widely used. Employing these materials, magnetic phase separation is promoted by heating the substrate during thin film formation, and so it is possible to form Cr-rich regions and Cr-poor regions within the thin film. Cr is nonmagnetic, and by adjusting the composition a structure can be realized in which Cr-poor ferromagnetic crystal grains are surrounded by Cr-rich nonmagnetic regions. A. Murayama and M. Miyamura, J. Appl. Phys., Vol. 76, pp. 5361-70 (1994) and S. Iwasaki and K. Ouchi, IEEE Trans. Magn., Vol. 14, pp. 849-851 (1978) disclose that through use of this method, magnetic characteristics are improved and read/write characteristics are enhanced.

There are also examples in which, without using phase separation by substrate heating, a nonmagnetic body which is completely insoluble is intermixed with a ferromagnetic material, to realize a granular structure in which ferromagnetic crystal grains are forcibly surrounded by a nonmagnetic material. For example, cases have been studied in which an oxide, of which $SiO_2$ is representative, is added to a Co-base material system, or C is added to a material system based on Fe; various such methods are disclosed in T. Oikawa et al, IEEE Trans. Magn., Vol. 38, pp. 1976-1978 (2002) and J. S. Chen et al, J. Appl. Phys., Vol. 103, pp. 07F517 1-3 (2008). The above-described structures are standard structures in recent high-density magnetic recording media, and in particular in perpendicular magnetic recording media.

The second issue is that of accommodating writing of signals to minute regions by reducing the sizes of magnetic crystal grains. In order to make magnetic crystal grains smaller in size, reducing the crystal grain size of the layer immediately therebelow (the underlayer) is effective, and various underlayers have been studied (see for example T. Oikawa et al, IEEE Trans. Magn., Vol. 38, pp. 1976-1978 (2002) and W. K. Shen et al, J. Appl. Phys., Vol. 97, pp. 10H301 1-3 (2005)). In addition to magnetic layers, it has also been disclosed that magnetic characteristics are improved by adding various materials to the underlayer to induce a granular structure (I. Takekuma et al, J. Appl. Phys., Vol. 99, pp. 08E713 1-3 (2006)).

In I. Takekuma et al, J. Appl. Phys., Vol. 99, pp. 08E713 1-3 (2006) presented as an example above, a method is disclosed in which, by adding $SiO_2$ to Ru to realize an underlayer with a granular structure, a perpendicular magnetic recording medium with improved characteristics and in which reduced magnetostatic interaction between and smaller sizes of magnetic crystal grains are realized. And as indicated in Y. Inaba et al, IEEE Trans. Magn., Vol. 41, pp. 3136-3138 (2005), R. H. Victora et al, IEEE Trans. Magn., Vol. 41, pp. 537-542 (2005), and D. Suess et al, Appl. Phys. Lett., Vol. 87, pp. 012504 1-3 (2005), in recent years methods have been used in which numerous layers with different characteristics are stacked to improve the magnetic recording medium characteristics. Further, as described in R. Mukai et al, IEEE Trans. Magn., Vol. 41, pp. 3169-3171 (2005), in order to obtain desired characteristics in the magnetic layer, often an underlayer with a multilayer stacked structure is adopted. If the magnetic layer or the underlayer is configured using two layers, the lower-portion layer behaves as an underlayer with respect to the upper-portion layer. Hence in order to raise the recording density of a magnetic recording medium, a quantitative understanding of the effects of granular material characteristics on the microstructure and consequently on read/write characteristics, and simplification of material selection, are sought.

SUMMARY OF THE INVENTION

This invention has been devised in the light of the above-described problems, and has as an object of providing a perpendicular magnetic recording medium with high recording density, which realizes both reduced magnetostatic interaction between magnetic crystal grains and smaller sizes of magnetic crystal grains.

In order to attain the above-described object, a perpendicular magnetic recording medium of this invention includes, on a nonmagnetic substrate (12), a first layer (20) and a second layer (18) positioned immediately below the first layer (20); the first layer (20) has a granular structure in which a first magnetic crystalline material or a first nonmagnetic crystalline material (1) is surrounded by a first nonmagnetic amorphous material (2); and the second layer (18) has a granular structure in which a second magnetic crystalline material or a second nonmagnetic crystalline material (3) is surrounded by a second nonmagnetic amorphous material (4). When the first magnetic crystalline material or first nonmagnetic crystalline material (1) is taken to be material 1, the first nonmagnetic amorphous material (2) is taken to be material 2, the second magnetic crystalline material or second nonmagnetic crystalline material (3) is taken to be material 3, and the second nonmagnetic amorphous material (4) is taken to be material 4, and the interface energy when two different materials—material a and material b—are in contact is defined as $Ei(a//b)$, the surface energy when material a exists independently is defined as $Es(a)$, and the energy resulting by subtracting the sum of the respective surface energies ($\Sigma Es$) from the interface energy is defined as $G(a//b)$, at least the following condition is satisfied: when $G(1//3) < G(1//4)$ holds, either $G(2//4)$ or $G(1//3)$ is the minimum among $G(1//3)$, $G(1//4)$, $G(2//3)$ and $G(2//4)$, and when $G(1//3) < G(1//4)$ does not hold, $G(2//4)$ is the minimum among $G(1//3)$, $G(1//4)$, $G(2//3)$ and $G(2//4)$.

At this time, it is preferable that the above-described perpendicular magnetic recording medium further include a third layer (26) positioned immediately above the first layer (20), and that the third layer (26) have a granular structure in which a third magnetic crystalline material or a third nonmagnetic crystalline material (5) is surrounded by a third nonmagnetic amorphous material (6). Furthermore, it is preferable that when the third magnetic crystalline material or third nonmagnetic crystalline material (5) is taken to be material 5 and the third nonmagnetic amorphous material (6) is taken to be material 6, at least the following condition be satisfied: when G(5//1)<G(5//2) holds, either G(6//2) or G(5//1) is the minimum among G(5//1), G(5//2), G(6//1) and G(6//2), and when G(5//1)<G(5//2) does not hold, G(6//2) is the minimum among G(5//1), G(5//2), G(6//1) and G(6//2).

Further, in the above-described perpendicular magnetic recording medium, it is preferable that the second magnetic crystalline material or second nonmagnetic crystalline material (3) be positioned immediately below the first magnetic crystalline material or first nonmagnetic crystalline material (1) and formed from a material different from a material of the second nonmagnetic amorphous material (4). Further, it is preferable that the first layer (20) be a magnetic layer, and that the second layer (18) be a nonmagnetic underlayer. Further, it is preferable that, in the above-described perpendicular magnetic recording medium, the third layer (26) be a magnetic layer.

By means of this invention, a perpendicular magnetic recording medium with high recording density can be provided, in which both reduced magnetostatic interaction between and smaller sizes of magnetic crystal grains are realized.

BRIEF DESCRIPTION OF THE DRAWINGS

FIG. 5 shows planar TEM images of magnetic layers in media obtained in examples and a comparative example.

DESCRIPTION OF THE PREFERRED EMBODIMENTS

Figure 1:
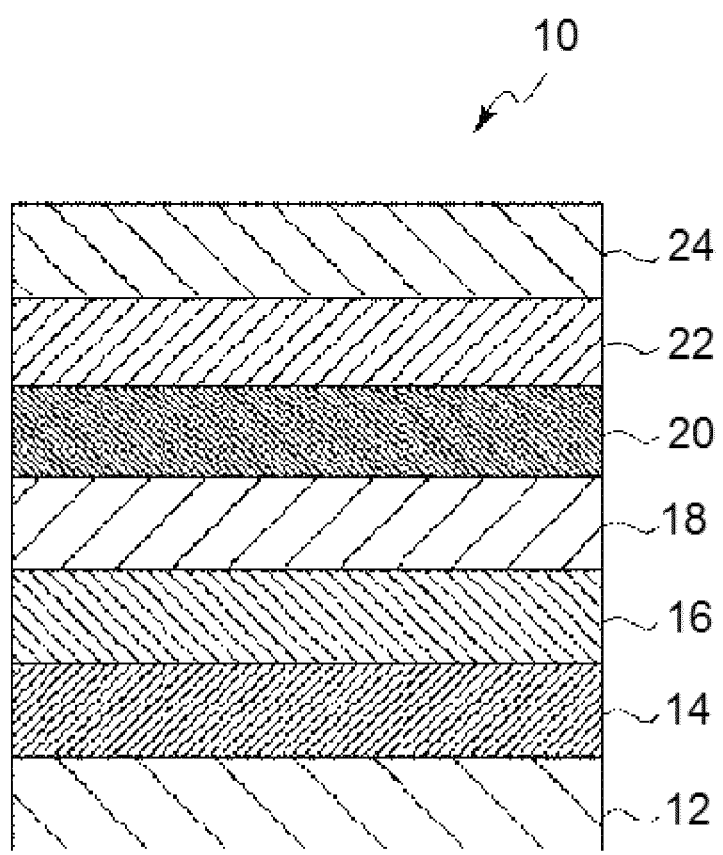
FIG. 1 is a schematic cross-sectional view showing an example of the configuration of a perpendicular magnetic recording medium of the invention.

FIG. 1 is a schematic cross-sectional view showing an example of the configuration of a perpendicular magnetic recording medium of the invention.

The perpendicular magnetic recording medium 10 includes, on a nonmagnetic substrate 12, a magnetic layer 20 (a specific example of a first layer) and a nonmagnetic underlayer 18 (a specific example of a second layer) positioned immediately below the magnetic layer 20.

As the nonmagnetic substrate 12, an Al substrate, a surface-oxidized Si wafer, a quartz substrate, a plastic resin substrate, or similar can be used. In the examples and the comparative examples described below, all substrates used as nonmagnetic substrates 12 are 2.5-inch glass discs, but the examples described below do not limit the substrate material.

On the nonmagnetic substrate 12 are formed, in order, a soft magnetic underlayer 14, a nonmagnetic seed layer 16, a nonmagnetic underlayer 18, a magnetic layer 20, a protective layer 22, and a liquid lubricating layer 24. In this invention, the soft magnetic underlayer 14, the nonmagnetic seed layer 16, the protective layer 22 and the liquid lubricating layer 24 are optional, and these can be fabricated using compositions and fabrication methods used in perpendicular magnetic recording media of the prior art.

Figure 2:
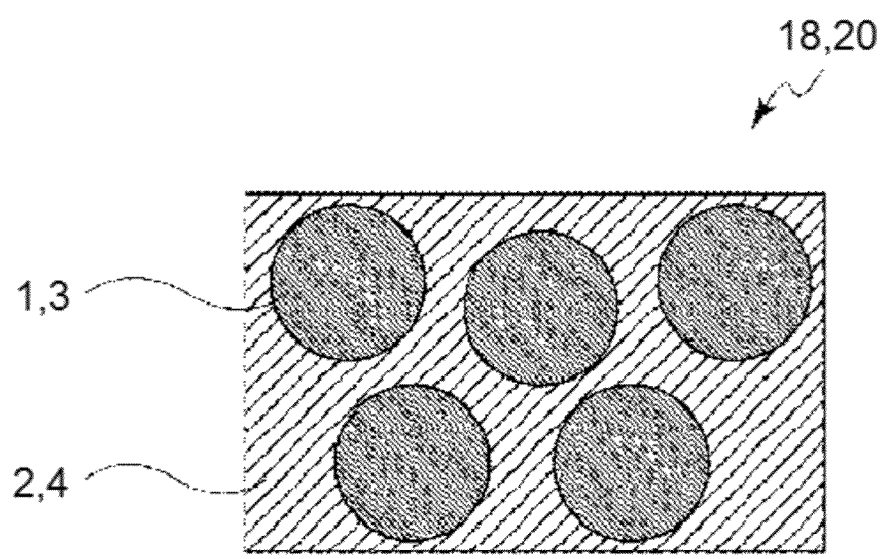
FIG. 2 is a schematic plane view showing an example of the configuration of the magnetic layer and the nonmagnetic underlayer in a perpendicular magnetic recording medium of the invention.
Figure 3:
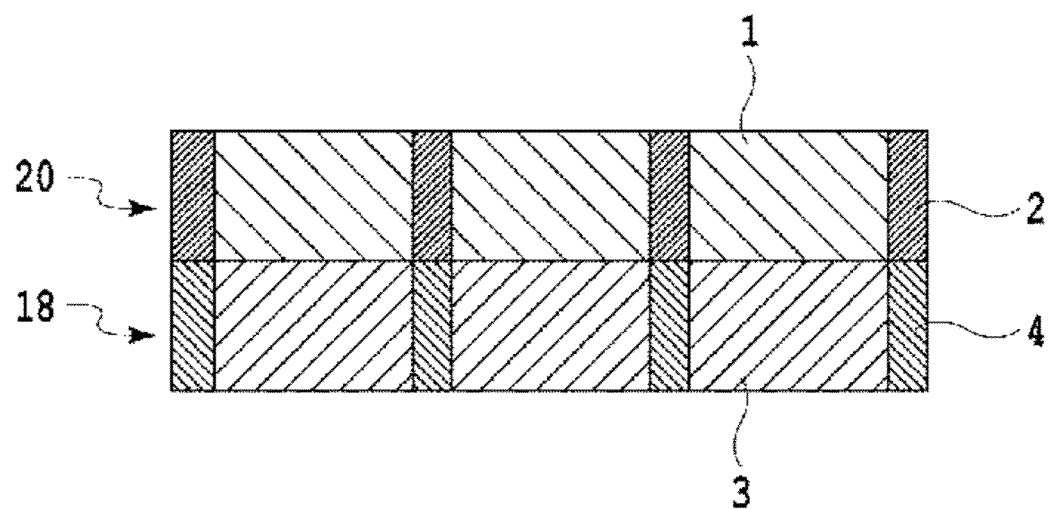
FIG. 3 is a schematic cross-sectional view showing an example of the configuration of the magnetic layer and the nonmagnetic underlayer in a perpendicular magnetic recording medium of the invention.

FIG. 2 is a schematic plane view showing an example of the configuration of the magnetic layer and the nonmagnetic underlayer in a perpendicular magnetic recording medium of the invention. FIG. 3 is a schematic cross-sectional view showing an example of the configuration of the magnetic layer and the nonmagnetic underlayer in a perpendicular magnetic recording medium of the invention.

As shown in FIG. 2 and FIG. 3, the magnetic layer 20 has a granular structure in which magnetic crystal grains 1 (a specific example of a first magnetic crystalline material) are surrounded by a nonmagnetic amorphous material 2 (first nonmagnetic amorphous material). As the magnetic crystal grains 1, FePt, FePd, CoPt, FeNi, CoPtCr, or similar can be used. It is preferable that the magnetic crystal grains 1 be formed from a ferromagnetic material. As the nonmagnetic amorphous material 2, C, TiN, MgO, $SiO_2$, $TiO_2$, $Ta_2O_5$, $Al_2O_3$, or similar can be used. In order to surround the magnetic crystal grains 1 with the nonmagnetic amorphous material 2, it is preferable that the volume ratio of the magnetic crystal grains 1 to the nonmagnetic amorphous material 2 be between 90:10 and 50:50. Y. Inaba et al, IEEE Trans. Magn., Vol. 40, pp. 2486-2488 (2004) discloses the changes to the magnetic characteristics and the read/write characteristics of granular media in which $SiO_2$ (a nonmagnetic amorphous material) is added to CoPtCr (a magnetic crystalline material), for various amounts of $SiO_2$. In the region of smaller amounts of added $SiO_2$, the CoPtCr cannot be surrounded, and a satisfactory granular structure cannot be realized. As a result, the magnetic coupling force between magnetic crystal grains cannot be reduced, and the S/N is degraded. On the other hand, in the region of large amounts of added $SiO_2$, the magnetic crystal grain sizes are extremely small, and thermal perturbations, that is, the magnitude of thermal energy is larger than the magnetic anisotropy energy, so that recorded signals are unstable. As a result, the S/N is degraded. When magnetic crystal grain sizes are small, use of a material with high magnetic anisotropy energy is effective for improving thermal stability. Moreover, by using a configuration in which the amount of amorphous material added is set according to the magnetic anisotropy energy of the magnetic crystal grains in order to maintain thermal stability, and in addition satisfying the above-described relations between G values, a satisfactory granular structure can be obtained even in the region of small amounts of amorphous material in particular.

As shown in FIG. 2 and FIG. 3, the nonmagnetic underlayer 18 has a granular structure in which nonmagnetic crystal grains 3 (a specific example of a second nonmagnetic crystalline material) are surrounded by a nonmagnetic amorphous material 4 (second nonmagnetic amorphous material). As the nonmagnetic crystal grains 3, MgO, TiN, CrN, Ru, Pt, or similar can be used. As the nonmagnetic amorphous material 4, TiN, VN, MgO, C, $TiO_2$, $Ta_2O_5$, $Al_2O_3$, or similar can be used. In order to surround the nonmagnetic crystal grains 3 with the nonmagnetic amorphous material 4, it is preferable that the volume ratio of the nonmagnetic crystal grains 3 to the nonmagnetic amorphous material 4 be between 90:10 and 50:50. In order to realize a perpendicular magnetic recording medium having excellent signal quality, it is preferable that nonmagnetic crystal grains included in the nonmagnetic underlayer and magnetic crystal grains included in the magnetic layer immediately thereabove have one columnar structure. To this end, it is preferable that both have the same grain size, and it is preferable that the volume ratios also conform to the volume ratio of magnetic crystal grains to a nonmagnetic amorphous material in the magnetic layer.

A structure is used in which magnetic crystal grains 1 in the magnetic layer 20 are grown on the nonmagnetic crystal grains 3 in the nonmagnetic underlayer 18, and it is preferable that the nonmagnetic crystal grains 3 be positioned immediately below the magnetic crystal grains 1, and be formed from a material different from the nonmagnetic amorphous material 4. The magnetic layer 20 or the nonmagnetic underlayer 18 may comprise at least two adjacent layers with different compositions.

Here, magnetic crystal grains 1 in the magnetic layer 20 are taken to be material 1, nonmagnetic amorphous material 2 theresurrounding is taken to be material 2, nonmagnetic crystal grains 3 in the nonmagnetic underlayer 18 are taken to be material 3, and nonmagnetic amorphous material 4 theresurrounding is taken to be material 4; the interface energy when different materials a and b are in contact is defined as Ei(a//b), the surface energy when material a exists independently is defined as Es(a), and the energy resulting by subtracting the sum of the respective surface energies (ΣEs) from the interface energy is defined as G(a//b). Here G<0 means that the interface energy is smaller than the sum of the surface energies, and that formation of an interface results in more stability. At this time, in order to stably dispose the nonmagnetic amorphous material 2 added in the magnetic layer 20 on the nonmagnetic amorphous material 4 in the nonmagnetic underlayer 18, the following equation must obtain.

$$G(2//4) < G(2//3) \quad \text{equation (1)}$$

In a state in which the above condition is satisfied, when considering growth of magnetic crystal grains 1 in the magnetic layer 20, the following two circumstances are conceivable.

1. A case in which growth begins on nonmagnetic crystal grains in the nonmagnetic underlayer
2. A case in which growth begins on nonmagnetic amorphous material in the nonmagnetic underlayer The above case 1 is equivalent to the following equation being satisfied.

$$G(1//3) < G(1//4) \text{ and moreover } G(1//3) < G(2//3) \quad \text{equation (2)}$$

In order to simultaneously satisfy equations (1) and (2), in the group of G(1//3), G(1//4), G(2//3) and G(2//4), it is sufficient that either G(2//4) or G(1//3) be the minimum.

The above case 2 is equivalent to the following equation being satisfied.

$$G(1//4) < G(1//3) \quad \text{equation (3)}$$

At this time, if G(2//4)<G(1//4), that is, if G(2//4) is the minimum in the group of G(1//3), G(1//4), G(2//3) and G(2//4), then the nonmagnetic amorphous material 2 rather than the magnetic crystal grains 1 existing in the magnetic layer 20 is preferentially coupled on the nonmagnetic amorphous material 4 existing in the nonmagnetic underlayer 18, and the magnetic crystal grains 1 grow on the nonmagnetic crystal grains 3 in the nonmagnetic underlayer 18.

In calculations of surface energies and interface energies in this study, A. Dannenberg et al, Phys. Rev. B, 80, 245438 (2009) and K. Matsunaga et al, Phys. Rev. B, 74, 125423 (2006) were consulted.

(Calculation of Surface Energy)

Consulting A. Dannenberg et al, Phys. Rev. B, 80, 245438 (2009), the surface energy of FePt is calculated using the following equation. In this proposal, the composition $Fe_{50}Pt_{50}$, including Fe and Pt in equal amounts is considered.

$$\gamma_{FePt} = (E^{tot}(N_{Fe}, N_{Pt}) - N_{Fe} \cdot \mu_{FePt(bulk)} - \Delta N \mu_{Pt(bulk)} - \Delta N[\mu_{Pt} - \mu_{Pt(bulk)}])/2A \quad \text{equation (4)}$$

where $E^{tot}(N_{Fe}, N_{Pt})$ is the total energy of the FePt surface model, $N_{Fe}$ and $N_{Pt}$ are the numbers of Fe and Pt atoms included in the surface model, $\mu_{FePt(bulk)}$ is the chemical potential of FePt, $\mu_{Pt(bulk)}$ is the chemical potential of bulk Pt, $\mu_{Pt}$ is the chemical potential of Pt within FePt, $\Delta N$ is $N_{Pt} - N_{Fe}$ (in this study, implementation is done to cases where $\Delta N=0$), and A is the area of the interface.

A summary of surface energy calculations in this study is given below.

Initially, calculations based on first principles are used to optimize the structure of the FePt bulk model, the total energy of the bulk model is determined, and from this $\mu_{FePt(bulk)}$ is obtained. Next, a surface (for example a (001) surface) is cut away from the bulk model, and a surface model is created with a 15 Å vacuum layer. First-principle calculations are used in structural optimization of this surface model, and the total energy ($E^{tot}(N_{Fe}, N_{Pt})$) for the surface model is obtained.

The energies obtained are substituted into equation (2) to calculate the FePt surface energy ($\gamma_{FePt}$).

Using this method, essentially the same calculations can be performed for MgO, TiN, C, and similar.

(Calculation of Interface Energy)

Upon for example assuming FePt grown on MgO, the energy of the interface between FePt and MgO can be calculated using the following equation.

$$\gamma_{FePt/MgO} = (E^{tot}_{FePt/MgO} - N_{Fe} \cdot \mu_{FePt(bulk)} - N_{Mg} \cdot \mu_{MgO(bulk)})/A - \gamma_{FePt} - \gamma_{MgO} \quad \text{equation (6)}$$

In this study, the following modeling was performed to calculate interface energies.

When FePt and MgO are adjacent, surfaces of FePt and MgO are each exposed on one side, and so the surface energies of both are subtracted. $\mu_{FePt(bulk)}$ and $\mu_{MgO(bulk)}$ are the same as for the case of surface energies. The FePt/MgO interface model is constructed from the bulk models. At this time, the plane orientation is taken to be (001) for both in consideration of experimental data, and the FePt lattice length was made to coincide with the MgO lattice length. Structural optimization of the FePt/MgO interface model was performed, and the total energy for the interface model was calculated. The FePt surface energy of equation (4) was calculated using a model in which only FePt was removed from the interface model after structural optimization. The interface energy was calculated from the total energy for the interface model, the surface models, and the bulk models thus obtained.

Essentially the same calculations can be performed for an MgO/C or other interface models.

Table 1 presents energies calculated by the above-described method by taking FePt as an example, together with reference values given in A. Dannenberg et al, Phys. Rev. B, 80, 245438 (2009).

The values obtained from the above-described calculations are found to agree well qualitatively with the reference values, and are sufficiently reliable for examination of tendencies in differences in growth modes due to energy differences.

TABLE 1

Comparison of surface energies obtained by
calculations with reference values

| | Surface energy (J/m$^2$) | Reference value (J/m$^2$) |
|---|---|---|
| FePt (001) | 2.372 | 2.121 |
| FePt (100) | 2.394 | 2.125 |
| FePt (111) | 1.851 | 1.763 |

Figure 4:
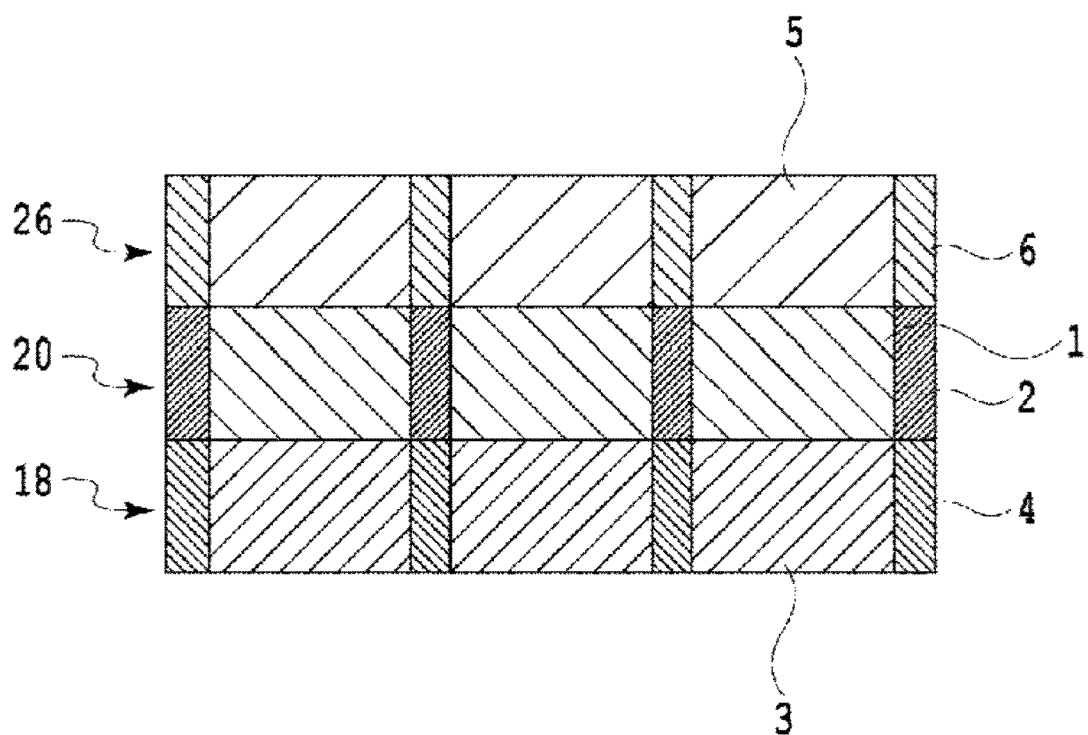
FIG. 4 is a schematic cross-sectional view showing another example of the configuration of the magnetic layer and the nonmagnetic underlayer in a perpendicular magnetic recording medium of the invention.

FIG. 4 is a schematic cross-sectional view showing another example of the configuration of the magnetic layer and the nonmagnetic underlayer in a perpendicular magnetic recording medium of the invention. The perpendicular magnetic recording medium of FIG. 4 includes, on a nonmagnetic substrate (not shown), a magnetic layer 20 (a specific example of a first layer) and, positioned immediately below the magnetic layer 20, a magnetic layer 18 (a specific example of a second layer). This perpendicular magnetic recording medium further includes a magnetic layer 26 (a specific example of a third layer), positioned immediately above the magnetic layer 20.

The magnetic layer 26 has a granular structure in which magnetic crystal grains 5 (a specific example of a third magnetic crystalline material) are surrounded by a nonmagnetic amorphous material 6 (a specific example of a third nonmagnetic amorphous material). A structure is used in which the magnetic crystal grains 5 in the magnetic layer 26 grow on the magnetic crystal grains 1 in the magnetic layer 20, and it is preferable that the magnetic crystal grains 1 in the magnetic layer 20 be positioned immediately below the magnetic crystal grains 5 in the magnetic layer 26 and formed from a material different from the nonmagnetic amorphous material 2 in the magnetic layer 20.

Here, when the magnetic crystal grains 5 are taken to be material 5 and the nonmagnetic amorphous material 6 is taken to be material 6, at least the following condition must be satisfied.

When G(5//1)<G(5//2) holds, either G(6//2) or G(5//1) is the minimum among G(5//1), G(5//2), G(6//1) and G(6//2), and when G(5//1)<G(5//2) does not hold, G(6//2) is the minimum among G(5//1), G(5//2), G(6//1) and G(6//2).

As the specific configurations and the methods of fabrication of the magnetic layer 26, the magnetic crystal grains 5, the nonmagnetic amorphous material 6, and other layers in the perpendicular magnetic recording medium, configurations and fabrication methods similar to those of the magnetic layer 20, the magnetic crystal grains 1, the nonmagnetic amorphous material 2, and other layers in the perpendicular magnetic recording medium of FIG. 1 to FIG. 3 can be respectively adopted, and configurations for the interface energies, the surface energies, and the G values similar to those of the layers of FIG. 1 to FIG. 3 can be adopted, and so explanations are omitted.

In order to verify the reasonableness of the above examination of energy, cases in which the nonmagnetic underlayer and the magnetic layer each comprise only a single layer, and cases in which at least one of these comprises two or more layers (that is, cases in which the nonmagnetic underlayer and the magnetic layer together comprise three or more layers), were considered separately, and experiments were conducted using the examples and the comparative examples described below. In each example, the film deposition conditions and the material compositions are merely examples indicating the advantageous effects of this proposal, and do not limit the scope of the invention of this application.

EXAMPLES

I. Case in which Both the Nonmagnetic Underlayer and the Magnetic Layer Comprise Only a Single Layer Example 1

An ultra-high vacuum (UHV) DC/RF magnetron sputtering apparatus (ANELVA, E8001) was used to fabricate samples. The final vacuum prior to the start of film deposition was $7.0 \times 10^{-7}$ Pa or lower. As the process gas, ultra-high purity Ar gas with an impurity concentration of 2 to 3 ppb was used. In order to enhance the strength of adhesion of thin film on glass substrate, 5 nm Ta was deposited, on which 1 nm MgO was deposited. Thereafter 20 nm Cr was deposited on the MgO as a nonmagnetic seed layer. On this, 20 nm MgO with TiN added was formed at 300° C. as a nonmagnetic underlayer. The amount of TiN added was adjusted to a volume ratio of approximately 30%, in order to enable a structure in which the MgO is surrounded by TiN. In the examples and the comparative examples described below, cases of "adding" mean adjustment such that the volume ratio of the added material to the entire volume is approximately 30%. The Ar gas pressure when depositing each layer was held constant at 0.3 Pa. As the MgO source, a target of MgO, comprising Mg and O in a 1:1 ratio, was used, and the gas used during film deposition was Ar with no oxygen added. The compositions of films formed were the same as the target composition; that is, composition analysis using energy dispersive X-ray spectrometry (EDX) was performed to confirm that the composition included Mg and O in a 1:1 ratio. Similarly, as the TiN source a target of TiN including Ti and N in a 1:1 ratio was used, and the gas used during film deposition was Ar with no nitrogen added. From EDX composition analyses, film compositions were confirmed to be TiN. The substrate temperature during deposition of nonmagnetic underlayers is a value that should be changed according to the fabrication equipment and conditions, and the temperature does not impair the advantageous effects of these examples.

As the magnetic layer, an FePt alloy with C added was formed to thickness 4 nm by co-sputtering Fe, Pt and C. The FePt composition was 55 at % Fe, 45 at % Pt, and EDX confirmed that substantially this same composition ratio was obtained. The amount of C added was adjusted to a volume ratio of approximately 30%, in order to be able to realize a structure in which FePt magnetic crystal grains are surrounded by C. This amount added is the same as the amount of TiN added in the MgO—TiN used in the nonmagnetic underlayer. The Ar gas pressure during magnetic layer deposition was held constant at 3.0 Pa, and the substrate temperature was made 300° C. Next, a CVD method was used to form a 3 nm protective film of carbon (C), and a 1 nm liquid lubricating layer was applied to fabricate a perpendicular magnetic recording medium on which a head can fly. Here, FePt was used in the magnetic layer merely as one example enabling advantageous results of this invention, and the advantageous results of this example are not limited thereby.

Example 2

As the nonmagnetic underlayer, MgO with VN added was used. The amount of added VN was adjusted to be a volume ratio of approximately 30% in order to realize a structure in which the MgO is surrounded by VN. The VN used in film deposition had a composition including V and N in a 1:1 ratio, and EDX confirmed that the composition of the fabricated thin film had the same composition as the target. Other than the above, the same conditions as in Example 1 were used to fabricate perpendicular magnetic recording media.

Comparative Example 1

As the nonmagnetic underlayer, TiN with MgO added was used. The amount of MgO added was adjusted to be a volume ratio of approximately 30% in order to realize a structure in which the TiN is surrounded by MgO. Other than the above, the same conditions as in Example 1 were used to fabricate perpendicular magnetic recording media.

Table 2 summarizes the layer configurations of Examples 1 and 2 and Comparative Example 1. Table 3 summarizes surface energy values for materials used in Examples 1 and 2 and Comparative Example 1, and Table 4 summarizes G values when combining the materials used in Examples 1 and 2 and Comparative Example 1, respectively. The surface and interface energies used when calculating G values were values which took the crystal growth face into account.

TABLE 2

Layer configurations in Examples 1 and 2
and Comparative Example 1

|  | Magnetic layer | Underlayer |
|---|---|---|
| Example 1 | $Fe_{55}Pt_{45}$—C | MgO—TiN |
| Example 2 | $Fe_{55}Pt_{45}$—C | MgO—VN |
| Comparative Example 1 | $Fe_{55}Pt_{45}$—C | TiN—MgO |

TABLE 3

Surface energy values of materials in
Examples 1 and 2 and Comparative Example 1

| Material | Surface energy, Es ($J/m^2$) |
|---|---|
| FePt | 2.372 |
| C | 11.988 |
| MgO | 0.875 |
| TiN | 0.201 |
| VN | 0.349 |

TABLE 4

G values when various materials are
combined (underlines denote the lowest G value)

|  | Interface | G = Ei − ΣEs ($J/m^2$) |
|---|---|---|
| Example 1 | 1//3 (FePt//MgO) | −0.702 |
|  | 1//4 (FePt//TiN) | −3.281 |
|  | 2//3 (C//MgO) | −0.074 |
|  | 2//4 (C//TiN) | −3.565 |
| Example 2 | 1//3 (FePt//MgO) | −0.702 |
|  | 1//4 (FePt/VN) | −3.453 |
|  | 2//3 (C//MgO) | −0.074 |
|  | 2//4 (C/VN) | −4.657 |
| Comparative Example 1 | 1//3 (FePt//TiN) | −3.281 |
|  | 1//4 (FePt//MgO) | −0.702 |
|  | 2//3 (C//TiN) | −3.565 |
|  | 2//4 (C//MgO) | −0.074 |

In Example 1, it is expected that FePt grows on MgO. Considering the G value of magnetic crystal grains, G(FePt//TiN)<G(FePt//MgO), and without further modification, FePt grows on the nonmagnetic amorphous material (here TiN) added to the nonmagnetic underlayer. However, focusing on C added to the magnetic layer, G(C//TiN) is the lowest of all the energies, and so C grows preferentially on the TiN in the nonmagnetic underlayer, and consequently FePt grows on MgO.

Similarly in Example 2 also, from the relations between G values, FePt growth on VN is more stable; but because C grows on VN, as a result FePt grows on MgO. On the other hand, in Comparative Example 1 it is expected that FePt grows on TiN. However, G(C//TiN)<G(C//MgO), and so C added to the magnetic layer is energetically more stable on TiN, and so is anticipated to inhibit growth of FePt on TiN.

FIG. 5 shows planar TEM images of magnetic layers in media obtained in Examples 1 and 2 and Comparative Example 1. As is anticipated from the energy relationships in both cases, it is seen that in Examples 1 and 2 granular structures having clear crystal grain boundaries are realized, and it is important that a material which is strongly bound to the material positioned at crystal grain boundaries in the magnetic layer be disposed at the crystal grain boundaries of the nonmagnetic underlayer. Cross-sectional TEM observations also confirmed that a structure is obtained in which the magnetic crystal grains of the magnetic layer grow on nonmagnetic crystal grains of the nonmagnetic underlayer. On the other hand, in Comparative Example 1 the FePt crystal grain boundaries are not clear, and a structure is seen in which a number of grains are connected. The thickness of the crystal grain boundaries is not uniform, and it is thought that a complex grain structure is formed as a result of active movement of the C added to the magnetic layer to above TiN, which is energetically more stable.

Table 5 shows, for media obtained in Examples 1 and 2 and Comparative Example 1, average grain diameters of crystal grains and grain diameter dispersions obtained from planar TEM image analyses of the magnetic layer and the nonmagnetic underlayer, and S/N ratios at a recording density of 1000 kFCI. Relative to Example 1, in Example 2 the average grain diameter and the grain diameter dispersion in the magnetic layer are smaller, and consequently the S/N ratio is higher. In terms of G values for granular addition materials added to the magnetic layer (nonmagnetic amorphous materials) and nonmagnetic amorphous materials used in the nonmagnetic underlayer, whereas in Example 1 the difference between G(C//TiN) and G(C//MgO) is 3.491 $erg/cm^2$, in Example 2 the difference between G(C//VN) and G(C//MgO) is 4.583 $erg/cm^2$ and large. The larger the energy difference, the more readily granular added material added to the magnetic layer is positioned above granular added material added to the nonmagnetic underlayer, so that energy differences are reflected in differences in the structures and the read/write characteristics. On the other hand, in Comparative Example 1 the grain diameter dispersion in the nonmagnetic underlayer is equal to that in the Examples, but the grain diameter dispersion in the magnetic layer is markedly larger, and as a result the S/N ratio is degraded. Hence in order to enhance the medium performance it is important that the surface and interface energies of materials be judged and selected appropriately, and the results demonstrate the superiority of the Examples.

TABLE 5

Average grain diameters and grain diameter dispersions in the magnetic layer and the nonmagnetic underlayer, and S/N ratios at a recording density of 1000 kFCI, in Examples 1 and 2 and Comparative Example 1

|  | Example 1 | Example 2 | Comparative Example 1 |
|---|---|---|---|
| Magnetic layer: Average grain diameter | 6.5 nm | 5.4 nm | 6.2 nm |
| Magnetic layer: Grain diameter dispersion | 20.3% | 15.8% | 26.4% |
| Nonmagnetic underlayer: Average grain diameter | 6.1 nm | 5.8 nm | 6.1 nm |
| Nonmagnetic underlayer: Grain diameter dispersion | 19.3% | 18.9% | 19.1% |
| S/N at 1000 kFCI | 5.2 dB | 7.2 dB | 1.1 dB |

II. Case in which at Least One Among the Nonmagnetic Underlayer and the Magnetic Layer Comprises Two or More Layers (Case in which at Least Three Granular Layers are Adjacent)

In a case in which at least one among the nonmagnetic underlayer and the magnetic layer comprises two or more layers, so that consequently three or more granular layers are adjacent, the following four patterns are conceivable, according to whether two adjacent layers satisfy equations (1) to (3). Here, layers are denoted X to Z, in order from the bottom, and it is assumed that layer X has a satisfactory granular texture. This is because, in a case where layer X does not have a satisfactory granular structure, under no conditions will the layer grown thereabove have a satisfactory granular structure, and the medium characteristics will be degraded.

1. A case in which X//Y and Y//Z both satisfy equation (1)
2. A case in which equations (1) to (3) are satisfied for X//Y, but are not satisfied for Y//Z
3. A case in which equations (1) to (3) are not satisfied for X//Y, but are satisfied for Y//Z
4. A case in which equations (1) to (3) are not satisfied for either X//Y or Y//Z In the above case 1, it is expected that a satisfactory granular structure is formed from X to Z. In the above case 2, it is expected that in the layer Y a satisfactory granular texture is formed and grows on the layer X, but that a satisfactory granular structure is not exhibited in the layer Z. On the other hand, in the above case 3, it is thought that the layer Y will not grow well on the layer X, and consequently that a satisfactory granular texture cannot be formed in the layer Z growing on the layer Y. In the above case 4, it is anticipated that satisfactory granular textures cannot be formed in any of the layers.

In Examples 3 and 4 and Comparative Examples 2 and 3 described below, a multilayer magnetic layer structure, which has become particularly important for increasing the recording densities of perpendicular magnetic recording media in recent years, is assumed, and it was decided to study cases in which a magnetic layer of two adjacent layers with different compositions (taken to be, in order from below, magnetic layer Y and magnetic layer Z) are grown on a single-layer nonmagnetic underlayer (taken to be nonmagnetic underlayer X). This examination can of course also be applied to cases in which the magnetic layer comprises a single layer and the nonmagnetic underlayer comprises two or more layers.

Example 3

MgO with TiN added was formed to 20 nm as a nonmagnetic underlayer, and on this FePt alloy with C added was formed to 4 nm as a magnetic layer. In addition, FePd alloy with C added was formed to 4 nm as a magnetic layer by co-sputtering of Fe, Pd and C. The composition of the FePd is made 50 at % Fe, 50 at % Pd, and it was confirmed from EDX that substantially the same composition ratio was obtained. The amount of C added was adjusted to a volume ratio of approximately 30%, in order that the FePd magnetic crystal grains could be surrounded by C. This added amount is the same as the amount of TiN added in the MgO—TiN used in the nonmagnetic underlayer. Other than the above, the same conditions as in Example 1 were used to fabricate perpendicular magnetic recording media.

Comparative Example 2

TiN with MgO added was formed to 20 nm as a nonmagnetic underlayer, and on this FePt alloy with C added was formed to 4 nm as a magnetic layer. And on this, FePd alloy with TiN added was formed to 4 nm as a magnetic layer. Other than the above, the same conditions as in Example 3 were used to fabricate perpendicular magnetic recording media.

Example 4

MgO with TiN added was formed to 20 nm as a nonmagnetic underlayer, and on this FePt alloy with C added was formed to 4 nm as a magnetic layer. And on this, FePd alloy with MgO added was formed to 4 nm as a magnetic layer. Other than the above, the same conditions as in Example 3 were used to fabricate perpendicular magnetic recording media.

Comparative Example 3

TiN with MgO added was formed to 20 nm as a nonmagnetic underlayer, and on this FePt alloy with C added was formed to 4 nm as a magnetic layer. And on this, FePd alloy with MgO added was formed to 4 nm as a magnetic layer. Other than the above, the same conditions as in Example 3 were used to fabricate perpendicular magnetic recording media.

Table 6 summarizes the layer configurations of Examples 3 and 4 and Comparative Examples 2 and 3, and Table 7 summarizes G values when combining materials in Examples 3 and 4 and Comparative Examples 2 and 3, respectively. Further, Table 8 shows S/N values at 1000 kFCI in Examples 3 and 4 and Comparative Examples 2 and 3. From comparisons of G values, it is anticipated that all the magnetic layers have satisfactory granular structures in Examples 3 and 4. As the reason for the inferior S/N in Example 4 as compared with Example 3, it is thought that the G values for 2//3 in the two magnetic layers of Example 4 (magnetic layers 1 and 2) are lower than the G values for 2//4, that is, that 2//3 is more stable than 2//4.

In Comparative Example 3, it is suggested that the granular structure in all magnetic layers is disrupted, and the S/N at 1000 kFCI is also the lowest value, corroborating structural degradation.

In Comparative Example 2, it is suggested that a satisfactory granular structure cannot be formed in the magnetic layer Y on the nonmagnetic underlayer X, and consequently the structure of the magnetic layer Z is also disrupted. The reason for the higher S/N value of Comparative Example 2 compared with Comparative Example 3 is inferred from energy considerations to be a satisfactory granular structure in the magnetic layer Z on the magnetic layer Y. However, compared with Examples 3 and 4, in which all layers have a satisfactory granular structure, the S/N is low.

TABLE 6

Layer configuration in Examples 3 and 4 and Comparative Examples 2 and 3 (adjacent layers described in adjacent columns)

|  | Magnetic layer Z | Magnetic layer Y | Nonmagnetic underlayer X |
|---|---|---|---|
| Example 3 | $Fe_{50}Pd_{50}$—TiN | $Fe_{55}Pt_{45}$—C | MgO—TiN |
| Comparative Example 2 | $Fe_{50}Pd_{50}$—TiN | $Fe_{55}Pt_{45}$—C | TiN—MgO |
| Example 4 | $Fe_{50}Pd_{50}$—MgO | $Fe_{55}Pt_{45}$—C | MgO—TiN |
| Comparative Example 3 | $Fe_{50}Pd_{50}$—MgO | $Fe_{55}Pt_{45}$—C | TiN—MgO |

TABLE 7

G values when various materials are combined (underlines denote the lowest G values)

|  |  | Interface | $G = E_i - \Sigma E_s$ (J/m$^2$) |
|---|---|---|---|
| Example 3 | Magnetic layer Z//magnetic layer Y | <u>5//1</u> (FePd//FePt) | <u>−3.891</u> |
|  |  | 5//2 (FePd//C) | −1.098 |
|  |  | 6//1 (TiN//FePt) | −3.281 |
|  |  | 6//2 (TiN//C) | −3.565 |
|  | Magnetic layer Y//nonmagnetic underlayer X | 1//3 (FePt//MgO) | −1.354 |
|  |  | 1//4 (FePt//TiN) | −3.281 |
|  |  | 2//3 (C//MgO) | −0.074 |
|  |  | <u>2//4 (C//TiN)</u> | <u>−3.565</u> |
| Comparative Example 2 | Magnetic layer Z//magnetic layer Y | <u>5//1</u> (FePd//FePt) | <u>−3.891</u> |
|  |  | 5//2 (FePd//C) | −1.098 |
|  |  | 6//1 (TiN//FePt) | −3.281 |
|  |  | 6//2 (TiN//C) | −3.565 |
|  | Magnetic layer Y//nonmagnetic underlayer X | 1//3 (FePt//TiN) | −3.281 |
|  |  | 1//4 (FePt/MgO) | −1.354 |
|  |  | <u>2//3 (C//TiN)</u> | <u>−3.565</u> |
|  |  | 2//4 (C//MgO) | −0.074 |
| Example 4 | Magnetic layer Z//magnetic layer Y | <u>5//1</u> (FePd//FePt) | <u>−3.891</u> |
|  |  | 5//2 (FePd//C) | −1.098 |
|  |  | 6//1 (MgO//FePt) | −1.354 |
|  |  | 6//2 (MgO//C) | −0.074 |
|  | Magnetic layer Y//nonmagnetic underlayer X | 1//3 (FePt//MgO) | −1.354 |
|  |  | 1//4 (FePt//TiN) | −3.281 |
|  |  | 2//3 (C//MgO) | −0.074 |
|  |  | <u>2//4 (C//TiN)</u> | <u>−3/565</u> |
| Comparative Example 3 | Magnetic layer Z//magnetic layer Y | <u>5//1</u> (FePd//FePt) | <u>−3.891</u> |
|  |  | 5//2 (FePd//C) | −1.098 |
|  |  | 6//1 (MgO//FePt) | −1.354 |
|  |  | 6//2 (MgO//C) | −0.074 |

TABLE 7-continued

G values when various materials are combined (underlines denote the lowest G values)

|  | Interface | $G = E_i - \Sigma E_s$ (J/m$^2$) |
|---|---|---|
| Magnetic layer Y//nonmagnetic underlayer X | 1//3 (FePt//TiN) | −3.281 |
|  | 1//4 (FePt//MgO) | −1.354 |
|  | <u>2//3 (C//TiN)</u> | <u>−3.565</u> |
|  | 2//4 (C//MgO) | −0.074 |

TABLE 8

S/N at 1000 kFCI for Examples 3 and 4 and Comparative Examples 2 and 3

|  | Example 3 | Comparative Example 2 | Example 4 | Comparative Example 3 |
|---|---|---|---|---|
| S/N at 1000 kFCI | 7.5 dB | 0.8 dB | 2.4 dB | 0.2 dB |

Finally, advantageous effects revealed by the results obtained from the Examples and the Comparative Examples are described.

As already stated, in order to raise the recording density of a perpendicular magnetic recording medium, it is important that the magnetostatic coupling force in the magnetic layer be small, and moreover that the sizes of crystal grains be made small. In the case of ordinary perpendicular magnetic recording media, attempts are made to enhance magnetic characteristics by enhancing the crystallographic characteristics of magnetic crystal grains, but to this end, the selection and conditions of formation of the nonmagnetic underlayer material are extremely important. In particular, in order to enhance the read/write characteristics, crystal grains with small sizes and a high degree of separation are sought in the nonmagnetic underlayer as well; but as seen in the results of the comparative examples, using a nonmagnetic underlayer having crystal grains with a high degree of separation and small sizes does not necessarily mean that a magnetic layer with good characteristics can be obtained. The inventors of this application discovered that the G values defined in the invention of this application are important indices for use when manufacturing perpendicular magnetic recording media. Specifically, the inventors of this application discovered that a G value, which is the energy resulting by subtracting the sum of the surface energies from the interface energy, enables highly precise prediction not only of the stability of each of materials which are vertically adjacent, but also the stability of materials which are not vertically adjacent (which are in oblique positions or laterally shifted positions), and discovered that by comparing these G values, stable structures can be predicted with considerable precision in actual perpendicular magnetic recording media. Using the method of this application in thorough examination of the surface and interface energies of materials used in magnetic layers and nonmagnetic underlayers and in selection of materials will greatly contribute to the formation of future high-density perpendicular magnetic recording media.

What is claimed is:

1. A perpendicular magnetic recording medium, comprising:
   a nonmagnetic substrate;
   a first layer having granular structure in which a first material is surrounded by a second material, the first material being a magnetic crystalline material, and the second material being a non-magnetic amorphous material; and
   a second layer positioned immediately below the first layer and having a granular structure in which a third material is surrounded by a fourth material, the third material being a non-magnetic crystalline material, and the fourth material being a non-magnetic amorphous material,
   wherein, when the first material is a material denoted by "1," the second material is a material denoted by "2," the third material is a material denoted by "3," and the fourth material is a material denoted by "4," an interface energy, $Ei(a//b)$, exists when two different materials including a material denoted by "a" and a material denoted by "b" are in contact, a surface energy, $Es(a)$, is determined when the material denoted by "a" exists independently, a surface energy, $Es(b)$, is determined when the material denoted by "b" exists independently, and an energy, $G(a//b)$, is determined by subtracting a sum of the respective surface energies ($\Sigma Es$) from the interface energy ($Ei(a//b)$), so that materials "a" and "b" are suitable for the perpendicular magnetic recording medium when a condition is satisfied as follows:
   $G(2//4)$ is the minimum among $G(1//3)$, $G(1//4)$, $G(2//3)$ and $G(2//4)$.

2. The perpendicular magnetic recording medium according to claim 1, wherein the third material is positioned immediately below the first material and formed from a material that is different from a material of the fourth material.

3. The perpendicular magnetic recording medium according to claim 1, further comprising a third layer positioned immediately above the first layer and having a granular structure in which a fifth material is surrounded by a sixth material, the fifth material being a magnetic crystalline material or a nonmagnetic crystalline material, the sixth material being a nonmagnetic amorphous material,
   wherein, when the fifth material is a material denoted by "5" and the sixth material is a material denoted by "6," materials "5" and "6" are suitable for the perpendicular magnetic recording medium when conditions are satisfied as follows:
   when $G(5//1)$ is less than $G(5//2)$, either $G(6//2)$ or $G(5//1)$ is the minimum among $G(5//1)$, $G(5//2)$, $G(6//1)$ and $G(6//2)$, and
   when $G(5//1)$ is greater than or equal to $G(5//2)$, $G(6//2)$ is the minimum among $G(5//1)$, $G(5//2)$, $G(6//1)$ and $G(6//2)$.

4. The perpendicular magnetic recording medium according to claim 3, wherein the third material is positioned immediately below the first material and formed from a material that is different from a material of the fourth material.

5. The perpendicular magnetic recording medium according to claim 3, wherein the third layer is a magnetic layer.

6. The perpendicular magnetic recording medium according to claim 1,
   wherein the first material is a magnetic crystal grain material selected from FePt, FePd, CoPt, FeNi, and CoPtCr, and
   wherein the second material is a nonmagnetic amorphous material selected from C, TiN, MgO, $SiO_2$, $TiO_2$, $Ta_2O_5$, and $Al_2O_3$.

7. The perpendicular magnetic recording medium according to claim 6,
   wherein the third material is nonmagnetic crystal grain material selected from MgO, TiN, CrN, Ru, and Pt, and
   wherein the fourth material is a nonmagnetic amorphous material selected from TiN, VN, MgO, C, $TiO_2$, $Ta_2O_5$, and $Al_2O_3$.

8. The perpendicular magnetic recording medium according to claim 1,
   wherein the first material is magnetic crystal grain, and a volume ratio of the first material and the second material is between 90:10 and 50:50.

9. The perpendicular magnetic recording medium according to claim 1,
   wherein the third material is a nonmagnetic crystal grain, and a volume ratio of the third material and the fourth material is between 90:10 and 50:50.

* * * * *